United States Patent [19]

Lipinski

[11] Patent Number: 5,489,135
[45] Date of Patent: Feb. 6, 1996

[54] ANTI-SQUEAK SPACER AND STOP FOR AUTOMOTIVE FIXED GLASS

[75] Inventor: Paul L. Lipinski, Plymouth, Mich.

[73] Assignee: Ford Motor Company, Dearborn, Mich.

[21] Appl. No.: 173,017

[22] Filed: Dec. 27, 1993

[51] Int. Cl.[6] ........................................ B60J 1/18
[52] U.S. Cl. .......................... 296/96.21; 52/204.597; 52/204.65; 296/201
[58] Field of Search ................. 296/96.21, 201, 296/146.15; 52/208, 204.591, 204.597, 204.62, 204.64, 204.65

[56] References Cited

U.S. PATENT DOCUMENTS

| | | | |
|---|---|---|---|
| 2,173,435 | 9/1939 | Fageol | 52/204.597 |
| 3,274,740 | 9/1966 | Hall | 52/208 |
| 4,249,356 | 2/1981 | Noso . | |
| 4,697,841 | 10/1987 | Klein et al. . | |
| 4,910,071 | 3/1990 | Kunert . | |
| 4,912,895 | 4/1990 | Harris, Jr. . | |
| 4,921,297 | 5/1990 | Stevens . | |
| 4,933,032 | 6/1990 | Kunert . | |
| 4,938,521 | 7/1990 | Kunert . | |
| 5,013,077 | 5/1991 | Stevens . | |
| 5,067,290 | 11/1991 | Kuroda et al. . | |
| 5,152,576 | 10/1992 | Ris . | |

FOREIGN PATENT DOCUMENTS 630062  10/1949  United Kingdom ................ 296/96.21

Primary Examiner—David M. Mitchell
Assistant Examiner—Kia M. Robinson
Attorney, Agent, or Firm—Daniel M. Stock; Roger L. May

[57] ABSTRACT

A fixed glass mounting assembly for automotive vehicles is provided in which a combination stop and spacer is provided in a mounting block that is carried on a flange of the vehicle body surrounding a window aperture. The mounting block is fabricated as a compression molded part made from a polypropylene fiber material to present a soft, smooth surface at its interface with adjacent window parts.

12 Claims, 2 Drawing Sheets

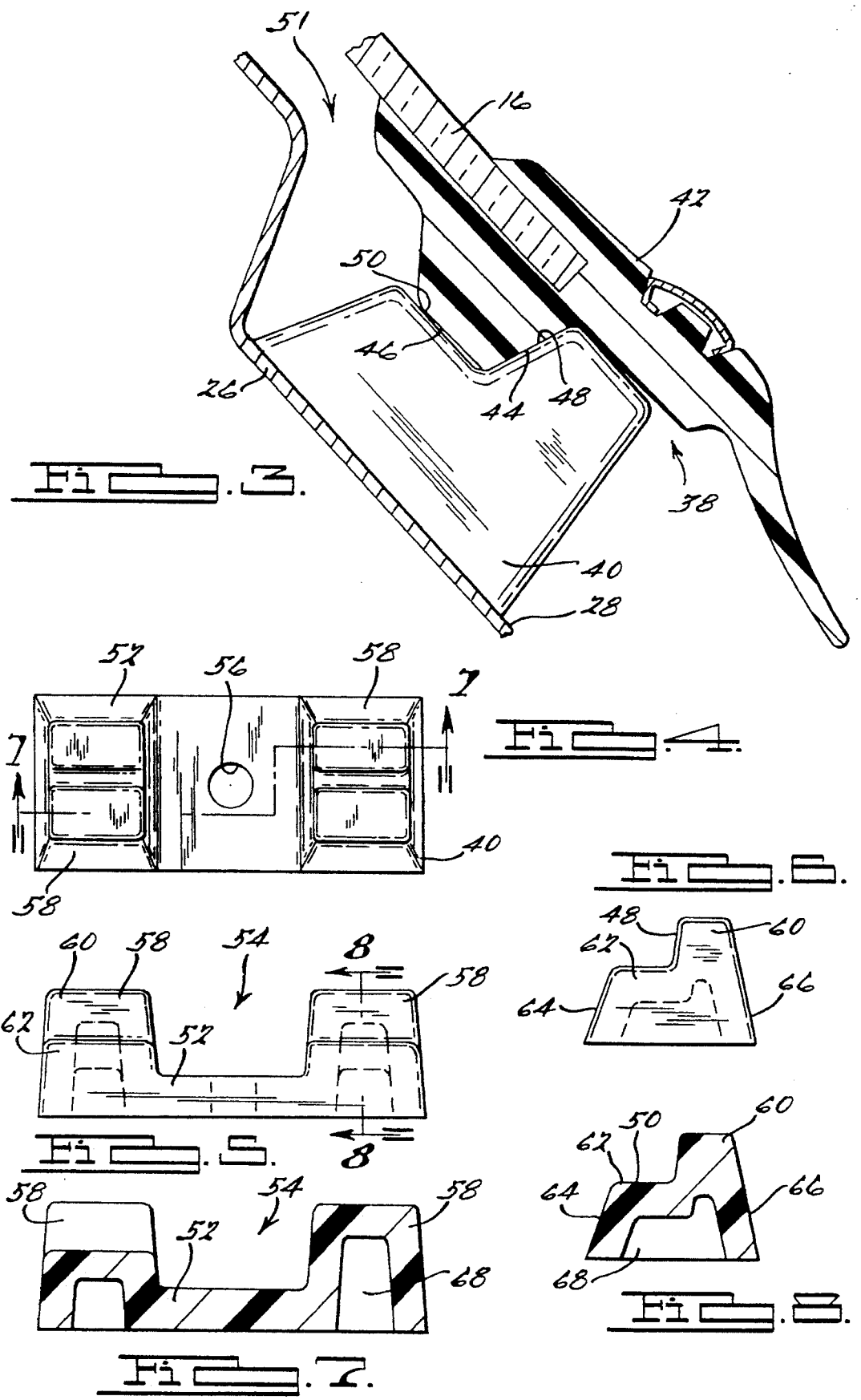

ANTI-SQUEAK SPACER AND STOP FOR AUTOMOTIVE FIXED GLASS

BACKGROUND OF THE INVENTION

1. Technical Field

The present invention relates generally to automotive fixed glass assemblies, and more specifically to mounting arrangements for such assemblies.

2. Description of Related Art

One of the more difficult processes in the manufacture of automotive vehicles is the accurate and repeatable installation of windows into fixed positions with respect to the vehicle body. The predominant practice in fixing the windows to the bodies is to apply an adhesive between the body and the glass for direct or indirect fixed securement of the glass to the body. Since this assembly process takes place on a moving assembly line, the holding in place of the glass with respect to the body while the adhesive cures is particularly important. It is important to hold the glass both in the plane of the body surface to which it is mounted as well as normal to that plane. Components usually referred as stops are often applied to the vehicle body to prevent movement in the plane of the body external surface. Other components, commonly referred to as spacers, are often applied to resist movement in the plane normal to the plane of the vehicle surface. Those skilled in the automotive vehicle body arts will appreciate that it would be desirable to provide the functions of both the stop and the spacer in a single component.

Another problem that is encountered in providing stops and spacers for positioning automotive fixed glass is the noise that is sometimes generated as the glass or intermediate structure surrounding the glass moves against the stops and spacers. This problem arises from the fact that many such spacers are fabricated from hard plastic materials such as thermoplastic polyolefin elastomers. Because such noises are annoying to vehicle occupants, solutions have been developed which include providing auxiliary foam strips and the like between mating surfaces as well as processing the plastic stops and spacers to add flocking. While effective, these solutions are unduly complex and expensive. It is therefore a strong desire of the automotive industry to provide a mounting arrangement that eliminates squeak without such added measures.

SUMMARY OF THE INVENTION

The disadvantages of the prior art fixed glass mounting assemblies, are overcome by the provision of mounting assembly that includes a peripherally framed glass pane which is mounted with respect to an automotive body window aperture through a mounting block that includes surfaces engaging the frame to prevent movement of the glass pane both parallel to and perpendicular to the plane of the window aperture.

According to an important aspect of the present invention, the mounting block is fabricated as a compression molded part from polypropylene fiber material.

BRIEF DESCRIPTION OF THE DRAWINGS

The advantages of the fixed glass mounting assembly of the present invention will be apparent to those skilled in the automotive body arts upon reading the following description with reference to the accompanying drawings, in which:

FIG. 3 is a cross-sectional view similar to FIG. 2 of the fixed glass mounting assembly of the present invention;

FIG. 4 is a top view of the mounting block;

FIG. 5 is a front view of the mounting block;

FIG. 6 is a side view of the mounting block.

FIG. 7 is a cross-sectional view taken along line 7—7 of FIG. 4; and

FIG. 8 is a cross-sectional view taken along line 8—8 of FIG. 5.

DESCRIPTION OF THE PREFERRED EMBODIMENTS

Figure 1:
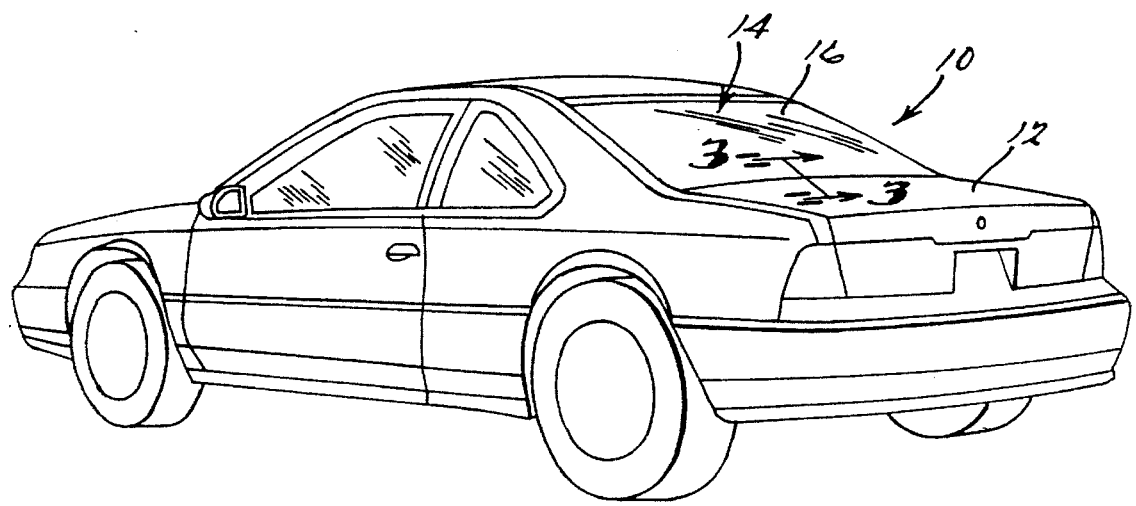
FIG. 1 is a perspective view of an automotive vehicle.

Turning now to drawings, and in particular to FIG. 1 thereof, an automotive vehicle 10 is illustrated as including a body 12 having a window aperture 14 formed through it for receiving a glass pane 16. The glass pane 16 is mounted to vehicle body 12, preferably in a manner that provides fixed securement of the glass pane 16 with respect to the body 12 during the adhesive fixing of the pane 16 to the body 12.

Figure 2:
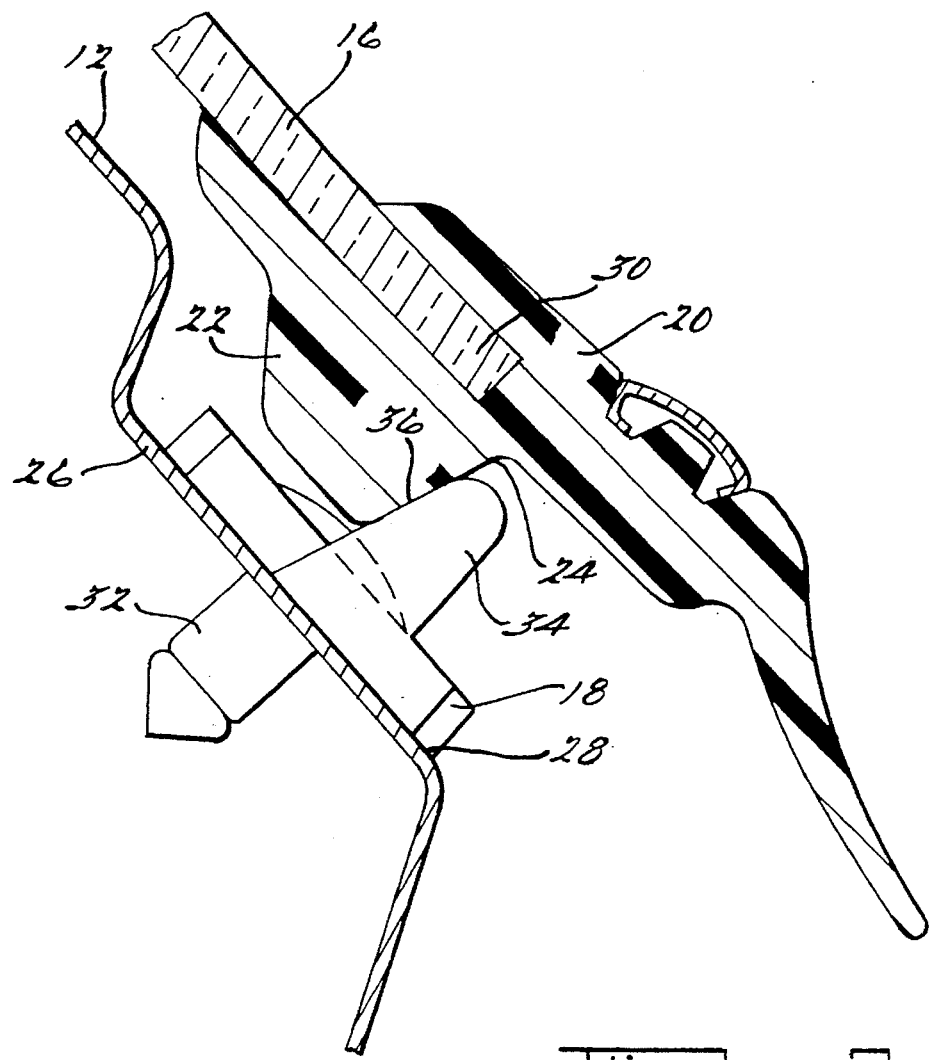
FIG. 2 is an enlarged cross-sectional view of a portion of a prior art fixed glass mounting assembly.

Turning next to FIG. 2, which shows a prior art mounting arrangement, the glass pane 16 includes a peripherally surrounding frame 20, which may be manufactured as a molded plastic part, including a downward depending stop portion 22 which includes a surface 24 projecting toward the vehicle body 12. The body 12 includes a flange 26 which is formed in a known manner around the window aperture 14 and includes a flat portion 28 generally coplanar with the outer edge portion 30 of glass pane 16. The stop 18, which in the prior art is fabricated as a thermoplastic polyolefin elastomer, is illustrated as being fixedly secured as by a fastener 32 to the flat surface 28 of the flange 26. A stop finger 34 projects generally perpendicularly upward from the surface 28 and presents a stop surface 36 for engagement with the surface 24 of the frame 20. It is at the interface between the surfaces 24 and 36 that relative movement can occur resulting in squeaking. It is to be understood that in mounting glass pane 16 into the body 12 of vehicle 10, other structure than the stop 18 illustrated in FIG. 2 is necessary to maintain the spacing between the glass pane 16 and the surface 28 while an adhesive (not shown) is applied between those parts. Further squeaking may occur through contact between the frame 20 and the body 12 if vehicle body build variations are not accomplished by the prior art spacer structures previously referred to.

Turning next to FIG. 3, the mounting assembly 38 according to the present invention is shown. This mounting assembly 38 differs essentially from the prior art mounting arrangement depicted in FIG. 2 in the provision of a mounting block 40 and its cooperation with the window 16 and its surrounding window frame 42 to replace and improve the function of the stop 18 as well as provide a spacing function between the body 12 and the window 16. The window frame 42 includes a stop surface 44 projecting generally perpendicularly from the window 16 toward the flat surface 28 of the flange 26 and a spacer surface 46 which extends generally parallel to the flat surface 28 of the flange. The surfaces 44, 46 are received in abutting engagement on complementary surfaces 48, 50 formed on the mounting block 40. Through this interaction, movement of the glass pane 16 parallel to and perpendicular to the surface 28 is prevented while adhesive, which is applied in the space 51 between the glass 16 and the flange 26, cures during the assembly process.

Turning now to FIGS. 4–8, the detailed construction of the mounting block may be appreciated. The mounting block 40 is preferably fabricated as a compression molded part made from polypropylene fiber material. The material choice, which preferably specifies a minimum of 70% polypropylene fibers and a maximum of 30% other synthetic fibers and which has a density before compression molding of approximately 112 kilograms per cubic meter, presents a soft, textured surface exhibiting a low coefficient of friction to the frame or to the glass in an application in which a frame is not used and a glass mounts directly on the mounting block 40 of the edge of the glass itself. Nevertheless, upon compression molding to the shape shown in FIGS. 4–6, it presents a part strong enough to provide the stop and spacing functions described. The incompressibility of the block 40 resulting from its material and its fabrication processing provides reliable spacing control with respect to the body 12, further addressing the problem of squeak.

According to the preferred embodiment shown, the mounting block 40 includes a generally rectangular base portion 52 defining a central pocket 54 through which a mounting hole 56 for receiving a suitable fastener is provided. Flanking the pocket 54 are a pair of upstanding support towers 58. Each tower has a high stop portion 60 and a lower spacer portion 62 through which the surfaces 48, 50 are formed. The mounting block has an inner side 64 positioned laterally inwardly with respect to the glass pane 16 and an outer side 66 opposite thereto. It will be noted that the sides 64, 66 converge toward one another to facilitate fabrication in the compression molding process.

Also provided for purposes of reducing weight and facilitating molding are cavities 68 centrally located within in the upstanding support towers 58.

While only one embodiment of the fixed glass mounting assembly of the present invention has been described, others may be possible without departing from the scope of the appended claims.

What is claimed is:

1. A fixed glass mounting assembly for an automotive vehicle having a body and a window aperture formed through the body, the mounting assembly comprising:

a glass pane having a substantially planar, peripheral edge portion;

a frame peripherally surrounding the pane and receiving the glass pane edge portion, and having a depending stop portion having a stop surface generally perpendicular to the glass pane edge portion and a spacer surface generally parallel to the glass pane edge portion;

a flange formed in the body around the window aperture and having a flat mounting surface positioned in facing relationship with respect to the glass pane edge portion; and a mounting block fixedly secured to the flange flat surface and engaging only the stop portion stop surface, and spacer surface to prevent movement of the glass pane both parallel to and perpendicular to the flange flat surface.

2. A fixed glass mounting assembly as defined in claim 1 wherein the mounting block includes a flat spacer surface parallel to the flange flat mounting surface and a generally vertical stop surface projecting from the spacer surface away from the flange flat surface, both the spacer surface and the stop surface abuttingly engaging the depending portion of the frame, the mounting block otherwise being spaced from the frame.

3. A fixed glass mounting assembly as defined in claim 1 wherein the mounting block is a compression molded part fabricated from polypropylene fiber material.

4. A fixed glass mounting assembly as defined in claim 3 wherein the polypropylene fiber material comprises a minimum of 70% polypropylene fibers and a maximum of 30% other synthetic fibers.

5. A fixed glass mounting assembly as defined in claim 3 wherein the density of the polypropylene fiber material before compression molding is approximately 112 kilograms per cubic meter.

6. A fixed glass mounting assembly as defined in claim 2 wherein the mounting block is a compression molded part fabricated from polypropylene fiber material.

7. A fixed glass mounting assembly as defined in claim 6 wherein the density of the polypropylene fiber material before compression molding is approximately 112 kilograms per cubic meter.

8. A fixed glass mounting assembly as defined in claim 1 wherein a plurality of spaced mounting blocks are secured to the flange and engage the frame.

9. A fixed glass mounting assembly for an automotive vehicle having a body and a window aperture formed through the body, the mounting assembly comprising:

a glass pane having a substantially planar, peripheral edge portion;

a flange formed in the body around the window aperture and having a flat mounting surface positioned in facing relationship with respect to the glass pane edge portion;

a frame peripherally surrounding the pane and receiving the glass pane edge portion, the frame further including a stop surface projecting generally perpendicularly toward the flange flat mounting surface and a spacer surface extending generally parallel to the flange flat mounting surface; and mounting block fixedly secured to the flange flat surface and having a spacer surface extending generally parallel to the flange flat surface abuttingly receiving the frame spacer surface and a stop surface extending generally perpendicular to the flange flat surface abuttingly engaging the frame stop surface, the mounting block being otherwise spaced from the frame, to thereby prevent movement of the glass pane both parallel to and perpendicular to the flange flat surface.

10. A fixed glass mounting assembly as defined in claim 9 wherein the mounting block is a compression molded part fabricated from polypropylene fiber material.

11. A fixed glass mounting assembly as defined in claim 10 wherein the polypropylene fiber material comprises a minimum of 70% polypropylene fibers and a maximum of 30% other synthetic fibers.

12. A fixed glass mounting assembly as defined in claim 10 wherein the density of the polypropylene fiber material before compression molding is approximately 112 kilograms per cubic meter.

* * * * *